United States Patent
Amiriyan et al.

(10) Patent No.: US 11,708,859 B2
(45) Date of Patent: Jul. 25, 2023

(54) BEARING ELEMENT HAVING POLYMERIC COATING AND METHOD OF APPLICATION OF POLYMERIC COATING TO BEARING ELEMENT FOR ELECTRICAL INSULATION

(71) Applicant: Schaeffler Technologies AG & Co. KG, Herzogenaurach (DE)

(72) Inventors: Mahdi Amiriyan, Wooster, OH (US); Mitchell Valaitis, Eastlake, OH (US); Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/551,898

(22) Filed: Dec. 15, 2021

(65) Prior Publication Data
US 2023/0184292 A1    Jun. 15, 2023

(51) Int. Cl.
*F16C 19/52* (2006.01)
*F16C 33/62* (2006.01)
(Continued)

(52) U.S. Cl.
CPC ............ *F16C 33/62* (2013.01); *F16C 19/525* (2013.01); *F16C 33/64* (2013.01);
(Continued)

(58) Field of Classification Search
CPC .......... F16C 19/05; F16C 19/52; F16C 33/62; F16C 33/64; F16C 2202/10;
(Continued)

(56) References Cited

U.S. PATENT DOCUMENTS 5,059,041 A * 10/1991 Watanabe ............. F16C 33/586
                                                            384/536
5,375,933 A * 12/1994 Mizutani ................. F16C 33/62
                                                            384/492
(Continued)

FOREIGN PATENT DOCUMENTS

CN        104718386 A  *  6/2015
CN        108757740 A  * 11/2018  ............ F16C 33/581
(Continued)

OTHER PUBLICATIONS

AkzoNobel Coatings Inc.—Powder Coatings, "Technical Data Sheet—Interpon TP," Feb. 22, 2019 (2 pages).
(Continued)

*Primary Examiner* — Phillip A Johnson
(74) *Attorney, Agent, or Firm* — Volpe Koenig

(57) ABSTRACT

A method of providing electrical insulation for at least one portion of a bearing element is disclosed herein. The method includes electrostatically spraying a polymer coating to the at least one portion of the bearing element, and the polymer coating comprises a thermoset epoxy coating or a self-adhering nylon powder coating. The bearing element can be grounded during the electrostatic spraying. The method includes heating the polymer coating in an oven at a temperature less than or equal to 220° C. for a predetermined time, such that after removal from the oven, the polymer coating has a porosity of less than 10%. The coated bearing element has a resistance of at least 50 MΩ resistance under dry conditions and 10 MΩ resistance under wet conditions.

19 Claims, 3 Drawing Sheets

(51) Int. Cl.
*F16C 33/66* (2006.01)
*F16C 33/64* (2006.01)

(52) U.S. Cl.
CPC ...... *F16C 2202/10* (2013.01); *F16C 2202/30* (2013.01); *F16C 2208/60* (2013.01); *F16C 2208/86* (2013.01); *F16C 2223/42* (2013.01); *F16C 2240/60* (2013.01); *F16C 2380/26* (2013.01)

(58) Field of Classification Search
CPC .............. F16C 2202/30; F16C 2208/60; F16C 2208/86; F16C 2223/42; F16C 2240/60; F16C 2380/26; F16C 19/525; F16C 41/002; F16C 2208/62; F16C 2233/00; C23C 4/00; C23C 4/02; C23C 24/04
See application file for complete search history.

(56) References Cited

U.S. PATENT DOCUMENTS

| | | | |
|---|---|---|---|
| 5,735,615 | A | 4/1998 | Pontzer |
| 6,342,272 | B1 * | 1/2002 | Halliwell ................. B05D 1/10 427/454 |
| 2004/0081755 | A1 | 4/2004 | Iwata et al. |
| 2006/0134344 | A1 | 6/2006 | Kitahata et al. |
| 2013/0084033 | A1 | 4/2013 | Martin et al. |
| 2013/0183539 | A1 * | 7/2013 | Guo ........................ F16C 33/206 427/470 |
| 2016/0312834 | A1 * | 10/2016 | White ................... F16C 33/586 |
| 2017/0356075 | A1 * | 12/2017 | Takeuchi ............. F16C 11/0685 |
| 2018/0128317 | A1 * | 5/2018 | Horchheimer .......... F16C 33/62 |
| 2019/0120288 | A1 * | 4/2019 | Yamada .................. F16C 33/64 |
| 2021/0140479 | A1 * | 5/2021 | Ijima ...................... F16C 41/04 |

FOREIGN PATENT DOCUMENTS

| | | | |
|---|---|---|---|
| DE | WO-2011128325 | A1 * | 10/2011 |
| DE | 102020201509 | A1 * | 8/2021 |
| FR | 2985215 | A1 * | 7/2013 |
| WO | 2008081650 | A1 | 7/2008 |

OTHER PUBLICATIONS

AkzoNobel Powder Coatings, "Product Data Sheet—Interpon A1000," Aug. 6, 2020 (2 pages).

\* cited by examiner

BEARING ELEMENT HAVING POLYMERIC COATING AND METHOD OF APPLICATION OF POLYMERIC COATING TO BEARING ELEMENT FOR ELECTRICAL INSULATION

FIELD OF INVENTION

The present disclosure is directed to a bearing element, and more particularly is directed to a polymeric coating treatment for a bearing element.

BACKGROUND

Bearing elements, such as bearing rings, can experience undesirable electrical discharge due to static buildup and other issues during running operation. These issues are particularly problematic in electric motors, traction motors, generators, and other high-speed applications.

Accordingly, there is a need to provide an electrical insulation configuration to protect the bearing elements from undesirable electrical discharge issues. One known solution for addressing electrical discharge issues utilizes ceramic coatings. However, ceramic coatings are relatively expensive and provide more insulation than is generally required in certain applications. Additionally, ceramic coatings are porous and susceptible to fail in wet conditions or environments.

Accordingly, there is a need to provide a cost-effective and reliable electrical insulation solution for bearing elements.

SUMMARY

A method of providing electrical insulation for at least one portion of a bearing element is provided herein. The method includes applying a polymer coating to at least one portion of a bearing element and then heating the polymer coating. Heating the polymer coating can cause melting of the polymer coating, curing of the polymer coating, or a combination of both melting and curing.

The polymer coating can be applied via electrostatic spraying. The bearing element can be grounded during the electrostatic spraying. The bearing element can be a bearing ring, in one embodiment. The at least one portion of the bearing element can include any outer surface of the bearing element. For example, the at least one portion of the bearing element can include a radially outer surface, axial end faces, and shoulders defined between the radially outer surface and the axial end faces.

The polymer coating can be a self-adhering nylon powder coating, in one embodiment. The polymer coating can be a thermoset epoxy coating, in one embodiment.

In one aspect, heating the polymer coating occurs in an oven. In one embodiment, the temperature of the oven is set at 215° C.-225° C. The heating step can occur for 20-30 minutes, depending on the temperature.

The method can also include attaching a thermocouple to the bearing element prior to heating in order to monitor the temperature of the bearing element.

The bearing element can be configured to be used in an electric motor, or any other high-speed application.

The bearing element can have a resistance of at least 50 MΩ resistance under dry conditions and 10 MΩ resistance under wet conditions. The bearing element is configured to allow a current flow of less than 2.10 mA when tested with an applied potential of 0.23 kV.

The polymer coating can have a thickness of at least 100 μm and less than 300 μm after curing, hardening, or solidifying, and prior to a machining step. After machining, the thickness can vary. The polymer coating can have a porosity of less than 10%.

In another embodiment, the method includes electrostatic spraying a polymer coating to at least one portion of a bearing element, and the polymer coating comprises a thermoset epoxy coating or a self-adhering nylon powder coating. The bearing element can be grounded during the electrostatic spraying. The method includes heating the polymer coating in an oven at a temperature less than or equal to 220° C. for a predetermined time, such that after removal from the oven, the polymer coating on the bearing element has a porosity of less than 10%. The coated bearing element has a resistance of at least 50 MΩ resistance under dry conditions and 10 MΩ resistance under wet conditions.

In another embodiment, a bearing ring is provided that includes a body portion defining at least one raceway for a bearing element. At least one portion of the bearing element has a polymer coating comprising a self-adhering nylon powder coating or a thermoset epoxy coating. The polymer coating is applied to the at least one portion via electrostatic spraying and heating.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
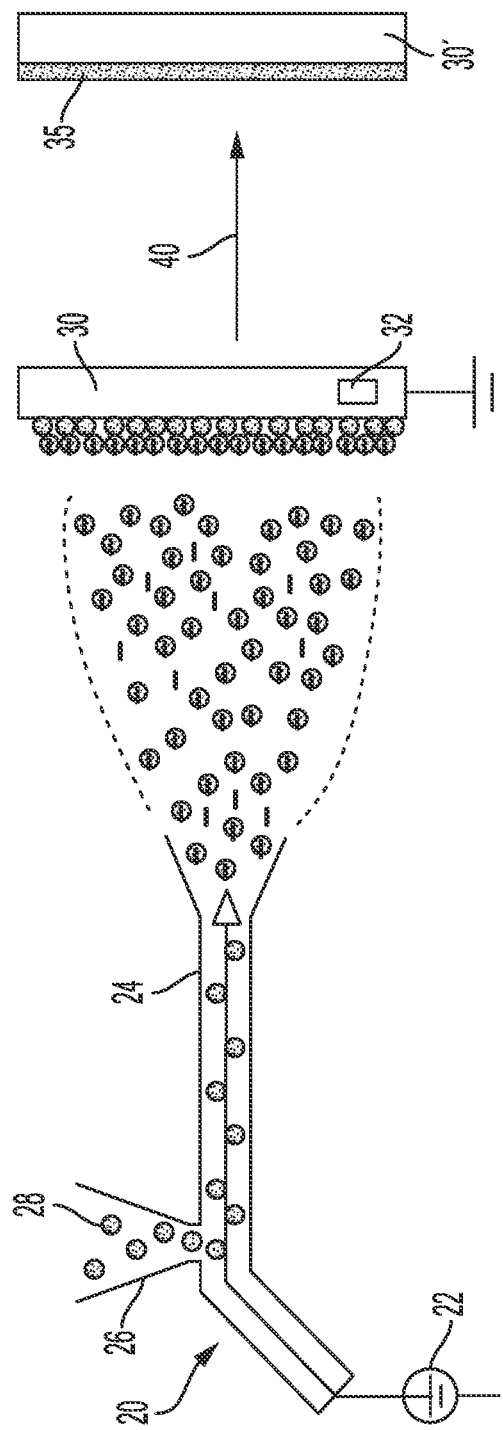
FIG. 1 is a schematic flow diagram for an exemplary process for applying a polymeric coating to a bearing element.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Another method of providing electrical insulation for at least one portion of a bearing element is generally disclosed herein. As used in this disclosure, the term bearing element can refer to any component of a bearing assembly, such as a ring, rolling element, cage, or other component. The method includes applying a polymer coating to at least one portion of a bearing element.

As shown in FIG. 1, an exemplary flow diagram or schematic is provided that shows the general steps associated with applying a polymeric coating 35 to a bearing element 30. In FIG. 1, an electrostatic spray assembly 20 is provided that generally includes a high voltage generator 22 and a barrel 24. A hopper 26 is included that is configured to hold a polymeric material 28 used for coating.

In one aspect, the electrostatic spray assembly 20 is positively charged and the bearing element 30 being coated is negatively charged from a housing or support part. The housing or support part can include a fixture configured to hold the bearing element during coating. This fixture can include a hook or other holder that supports the bearing elements being coated from areas that are not being coated.

The bearing element 30 can be grounded to provide a negative charge. One of ordinary skill in the art would understand that the charge of the electrostatic spray assembly 20 and the bearing element 30 can be reversed in another embodiment. One of ordinary skill in the art would understand from this disclosure that the charge configuration can be changed to match the surface chemistry of the polymer coating powder being applied. For example, some polymer powders used for electrostatic coatings can more easily be imparted with a negative charge while other polymer powders can more easily be imparted with a positive charge. In one aspect, the feasibility to impart different charges is determined by the surface energy of the powder particles.

The electrostatic spray assembly 20 can be configured to spray a mixture of coating particles and negatively charged coating particles onto a bearing element 30, which is shown schematically as a rectangle in FIG. 1. One of ordinary skill in the art would understand that the exact shape of the bearing element 30 will vary, and could include a bearing ring. In order to provide a uniform coating, the bearing element 30 can be rotated during the spraying application. Alternatively, the bearing element 30 may be stationary and the electrostatic spray assembly 20 can be mobile relative to the bearing element 30.

Regarding the polymer coating, the material used for the polymer coating can be a self-adhering nylon powder coating. As used in this context, the term self-adhering can refer to a condition where modification of the surface energies of the particles is unnecessary for the coating powder to adhere to the part surface. This means that a large amount of charge is not required to get the particles to adhere to the part, as they are already partially charged. In one aspect, this type of material does not need to be cured and instead is heated then melts, cools, and solidifies to adhere to the part surface.

In one aspect, each of the polymer coatings disclosed herein can be heated to promote adhesion to the bearing element. Certain materials will undergo melting during this heating step, and other materials will undergo curing. For example, in one aspect, thermoset coating formulations undergo curing reactions upon heating, while thermoplastic coatings undergo a phase change, i.e. melting, upon heating before cooling and adhering to the bearing element.

In one specific aspect, the polymer coating can be a thermoset epoxy coating with filler components. The term filler components can refer to non-polymer components that are in the coating. In one embodiment, filler components include anything other than the base polymer (which may be a resin in a thermoset coating) and the curative component (which is not present in thermoplastic coatings). These filler components can include any one or more of oxides, silicates, organic and inorganic fibers, and curative catalysts. A thermoset epoxy coating can refer to an epoxy formulation-based coating that requires elevated temperature heating in order to initiate the curing reaction. This curing reaction causes the polymer powder to crosslink and coalesce into a solid coating.

In one embodiment, the polymer coating can be a thermoset urethane, such as thermoset polyurethane. Thermoset urethanes are understood to one of ordinary skill in the art as a class of polymer coatings that are similar to epoxy coatings.

In one embodiment, the polymer coating can be a lower temperature curing epoxy coating, such as Interpon® A1000 AN010Q. One of ordinary skill in the art would recognize from this disclosure that equivalent formulations, similar formulations or variations of Interpon® A1000 AN010Q could be used. One of ordinary skill in the art would recognize from this disclosure that other formulations and materials could be used.

In one embodiment, a thermoplastic coating, such as nylon, can be used. When using this type of coating, the bearing element surface temperature is controlled during application and curing of the coating such that the temperature of the bearing element does not exceed the tempering temperature of the bearing element. This is critical for ensuring that the bearing element does not soften and possibly be deformed or otherwise result in failure. Thermoset coatings can be preferable to thermoplastic coatings, in one aspect, because the temperatures needed to produce a sufficient coating is typically lower for thermoset coatings as compared to thermoplastic coatings. Accordingly, the use of epoxy coatings for this type of bearing element is advantageous.

Arrow 40 in FIG. 1 represents a heating step. In one aspect, this heating step can be performed in an oven. The heating step can result in curing of the polymer coating, in one aspect. In another aspect, the heating step can cause melting of the polymer coating and subsequent hardening upon cooling to adhere to the bearing element. In one aspect, a mixture of both melting and curing can occur for the polymer coating to adhere to the bearing element.

The oven can be set at 215° C.-225° C. for 20-30 minutes, in one aspect. In another aspect, the heating step is performed at 220° C. for 25 minutes. The bearing element can be monitored to avoid exceeding a predetermined temperature that corresponds to metal softening. For example, the heating can be monitored and controlled such that the bearing element 30 itself never exceeds 206° C. during thermal coating curing or heating step. In one aspect, a thermocouple 32 or other type of sensor can be adhered to a surface of the bearing element 30 being coated. This can help monitor the bearing element 30 temperature to ensure that it does not reach a specific threshold. One of ordinary skill in the art would understand that the maximum allowable curing temperature will vary based on the material of the bearing element 30 being coated. In one aspect, the bearing element 30 is made of AISI 52100 hardened steel, which generally softens at temperatures ≥220° C. One of ordinary skill in the art would understand that the heating times and temperatures can vary.

In one embodiment, the bearing element is generally kept below 220° C. during the heating step, in one embodiment. However, the oven temperature can be kept higher than this temperature. The coating can be cured or melted at lower temperatures, but lower temperatures generally require longer cure times. For example, curing or melting times can increase from 10 minutes at 215° C. to 25 minutes at 206° C. One of ordinary skill in the art would understand that the curing or melting times can be tailored based on the amount of coating applied, oven temperature, and type of material for the bearing element.

Other types of curing could be used, such as photocuring. One of ordinary skill in the art would understand that various types of curing configurations, at various temperatures, durations, and using various principles or configurations can be used.

Masking can be used during the steps described herein to avoid applying the polymer coating treatment to portions of the bearing element that do not require any electrical insulation.

In one aspect, high-temperature resistant polymer films can be used for masking areas that need to remain uncoated. One of ordinary skill in the art would understand that masking is not necessary in another aspect. For example, low-pressure compressed air could be used to remove coating from areas that do not require the coating could be used. Alternatively, honing of the bearing race after coating, rather than before coating, is another way to remove coating that has adhered to regions of the bearing element that do not require the coating.

The at least one portion of the bearing element that is coated with the polymer coating can include at least an outer surface of the bearing element. The at least one portion of the bearing element can alternatively include at least a shoulder of the bearing element. In another aspect, the at least one portion of the bearing element includes both at least a shoulder of the bearing element and at least one outer surface of the bearing element.

In one aspect, the coating thickness is at least 100 μm and less than 300 μm after the heating step and subsequent cooling. In one aspect, the coating has a thickness of approximately 200 μm. The coating can then be further machined to reduce the thickness prior to use. One of ordinary skill in the art would understand that the coatings can be ground down to a desired thickness. The exact thickness of the polymer coating will depend on the final bearing application and coating formulation.

Coating porosity in the treated bearing element is essentially nonexistent according the processes disclosed herein. In one aspect, the treated bearing element including the polymeric coating 35 does not have any air bubbles or pores visible to the naked eye. In one aspect, the porosity is less than 10%.

Figure 2:
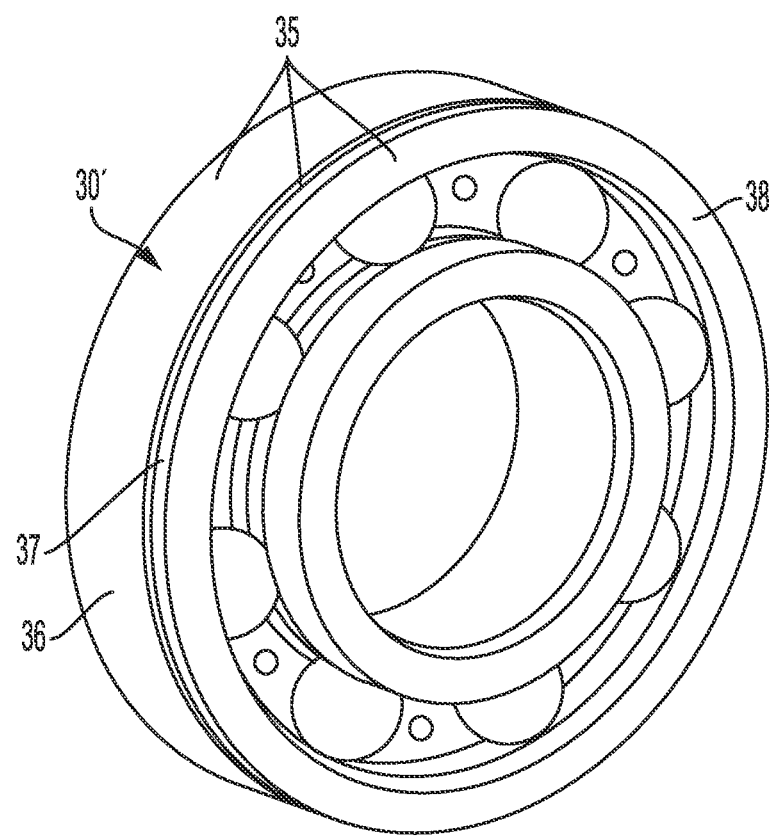
FIG. 2 is a perspective view of a bearing element having a polymeric coating.

FIG. 2 illustrates a treated bearing element 30' including a polymeric coating 35. In this Figure, the polymeric coating 35 has been applied to the radially outer surface 36, the shoulders 37, and the axial end faces 38 of the treated bearing element 30'. The raceway of the bearing element 30' remains untreated and lacks any coating. In one aspect, a uniform coating is applied to the outer surface 36, the shoulders 37, and the axial end faces 38 of the treated bearing element 30'.

The treated bearing element 30' including the polymeric coating 35 has a resistance of at least 50 MΩ resistance under dry conditions and 10 MΩ resistance under wet conditions. The term dry conditions refers to a general condition where no water or other liquids are present on the surface of the coating. The term wet conditions refers to a general condition where water or another liquid is present on the surface of the coating. This water or liquid can be present on the surface of the coating due to either condensation, environmental humidity, or splashing onto the coating surface.

Regarding insulation, a current measured through the treated bearing element 30' including the polymeric coating 35 is less than 2.10 mA when tested with an applied potential of 0.23 kV.

In one aspect, the treated bearing element 30' is configured to be used in an electric motor or other high-speed application. In one aspect, the treated bearing element 30' can be used in marine propulsion systems, windmills, and electric generators.

The treated bearing element 30' can consist only of the coating (which is a polymeric material) and the base material of the bearing element itself (i.e. steel or steel alloy). The treated bearing element 30' lacks any ceramic coating or elements, in one embodiment.

Figure 3:
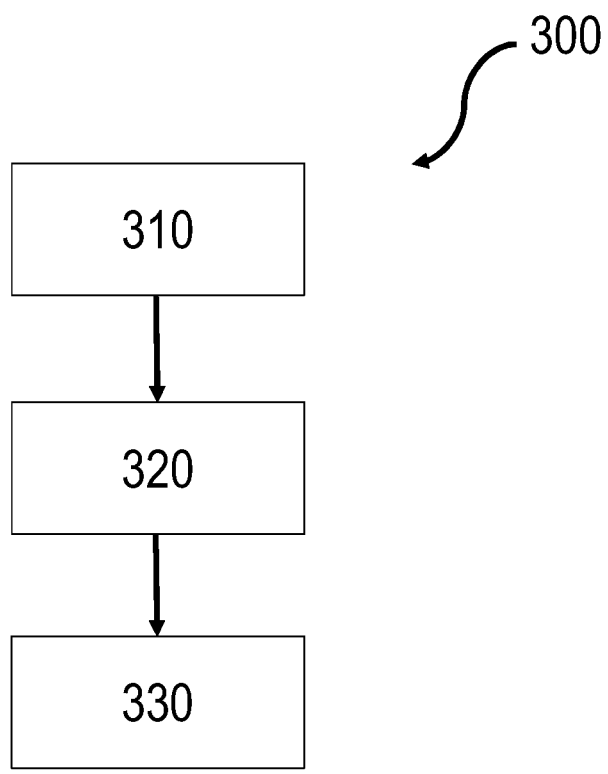
FIG. 3 is a process flow diagram for a method according to the present disclosure.

FIG. 3 illustrates a process flow for a method according to one aspect of the present disclosure. Specifically, FIG. 3 illustrates a process flow for a method 300 of providing electrical insulation for at least one portion of a bearing element. One of ordinary skill in the art would understand that more steps could be provided for the method than are shown in FIG. 3.

As shown in FIG. 3, step 310 includes applying a polymer coating to the at least one portion of the bearing element. The polymer coating can be applied via electrostatic spraying, in one aspect. The bearing element can be grounded during the electrostatic spraying. The polymer coating can be a self-adhering nylon powder coating. In another aspect, the polymer coating can be a thermoset epoxy coating.

The method can include step 320, which includes attaching a thermocouple to the bearing element. This step can be performed prior to applying the polymer coating, and can be performed in a region of the bearing element that does not receive the polymer coating. The thermocouple is configured to monitor the temperature of the bearing element.

Step 330 includes heating the polymer coating such that the polymer coating adheres to the at least one portion of the bearing element. The heating can be performed in an oven at 215° C.-225° C., for 20-30 minutes.

After step 330, the bearing element with the coating has a resistance of at least 50 MΩ resistance under dry conditions and 10 MΩ resistance under wet conditions, and current through the bearing element is less than 2.10 mA when tested with an applied potential of 0.23 kV.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS electrostatic spray assembly 20
high voltage generator 22
barrel 24
hopper 26
polymer material 28
bearing element 30
treated bearing element 30'
thermocouple 32
polymer coating 35 radially outer surface 36
shoulders 37
axial end faces 38
heating step 40

What is claimed is:

1. A bearing ring comprising:
a body portion defining at least one raceway for a bearing element; and
at least one portion having a polymer coating comprising a self-adhering nylon powder coating, wherein the polymer coating is applied to the at least one portion via electrostatic spraying and subsequent heating.

2. The bearing ring according to claim 1, wherein the at least one portion of the bearing element includes a radially outer surface, axial end faces, and shoulders defined between the radially outer surface and the axial end faces.

3. The bearing ring according to claim 1, wherein the bearing element has a resistance of at least 50 MΩ resistance under dry conditions and 10 MΩ resistance under wet conditions.

4. The bearing ring according to claim 1, wherein a current through the bearing element is less than 2.10 mA when tested with an applied potential of 0.23 kV.

5. A method of providing electrical insulation for at least one portion of a bearing element, the method comprising:
applying a polymer coating to the at least one portion of the bearing element;
attaching a thermocouple to the bearing element, the thermocouple being configured to monitor a temperature of the bearing element; and
heating the polymer coating such that the polymer coating adheres to the at least one portion of the bearing element;
wherein the thermocouple is attached to the bearing element prior to heating; and
wherein the thermocouple is attached to the bearing element prior to applying the polymer coating or the thermocouple is attached to a region of the bearing element that does not receive the polymer coating.

6. The method according to claim 5, wherein the polymer coating is applied via electrostatic spraying.

7. The method according to claim 6, wherein the bearing element is grounded during the electrostatic spraying.

8. The method according to claim 5, wherein the bearing element is a bearing ring.

9. The method according to claim 8, wherein the at least one portion of the bearing element includes at least an outer surface of the bearing element.

10. The method according to claim 8, wherein the at least one portion of the bearing element includes a radially outer surface, axial end faces, and shoulders defined between the radially outer surface and the axial end faces.

11. The method according to claim 5, wherein the polymer coating is a self-adhering nylon powder coating.

12. The method according to claim 5, wherein the polymer coating is a thermoset epoxy coating.

13. The method according to claim 5, wherein the heating is performed in an oven at 215° C.-225° C.

14. The method according to claim 13, wherein the heating occurs for 20-30 minutes.

15. The method according to claim 5, wherein the bearing element is configured to be used in an electric motor.

16. The method according to claim 5, wherein the bearing element has a resistance of at least 50 MΩ resistance under dry conditions and 10 MΩ resistance under wet conditions, and current through the bearing element is less than 2.10 mA when tested with an applied potential of 0.23 kV.

17. The method according to claim 5, wherein the polymer coating has a thickness of at least 100 μm and less than 300 μm.

18. The method according to claim 5, wherein the polymer coating has a porosity of less than 10%.

19. A method of providing electrical insulation for at least one portion of a bearing element, the method comprising:
electrostatic spraying a polymer coating to the at least one portion of the bearing element, the polymer coating comprising a self-adhering nylon powder coating or a thermoset epoxy coating, and the bearing element being grounded during the electrostatic spraying; and
heating the polymer coating in an oven at a temperature less than or equal to 220° C. for a predetermined time, such that after removal from the oven, the polymer coating has a porosity of less than 10%, and the coated bearing element has a resistance of at least 50 MΩ resistance under dry conditions and 10 MΩ resistance under wet conditions.

* * * * *